(12) United States Patent
Hwang et al.

(10) Patent No.: US 8,064,304 B2
(45) Date of Patent: Nov. 22, 2011

(54) RECORDING/REPRODUCING METHOD, RECORDING/REPRODUCING APPARATUS, OPTICAL RECORDING MEDIUM, AND COMPUTER READABLE RECORDING MEDIUM HAVING RECORDED THEREON PROGRAM FOR THE RECORDING/REPRODUCING METHOD

(75) Inventors: Sung-hee Hwang, Seoul (KR); Jung-wan Ko, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/026,907

(22) Filed: Feb. 6, 2008

(65) Prior Publication Data

US 2008/0130446 A1    Jun. 5, 2008

Related U.S. Application Data

(63) Continuation of application No. 10/821,187, filed on Apr. 9, 2004.

(30) Foreign Application Priority Data

| Apr. 15, 2003 | (KR) | ................................. | 2003-23727 |
| Apr. 15, 2003 | (KR) | ................................. | 2003-23728 |
| Apr. 15, 2003 | (KR) | ................................. | 2003-23729 |
| Mar. 15, 2004 | (KR) | ................................. | 2004-17253 |

(51) Int. Cl.
   *G11B 7/00* (2006.01)
(52) U.S. Cl. ............... 369/53.17; 369/47.14; 369/53.15; 714/710
(58) Field of Classification Search ......................... None
   See application file for complete search history.

(56) References Cited

U.S. PATENT DOCUMENTS

| 4,849,956 A |   | 7/1989  | Aizawa |
| 5,111,444 A | * | 5/1992  | Fukushima et al. ....... 369/53.17 |
| 5,940,853 A |   | 8/1999  | Ooi et al. |
| 5,978,336 A |   | 11/1999 | Mine et al. |
| 6,243,338 B1 |  | 6/2001  | Mine |
| 6,367,038 B1 | * | 4/2002 | Ko .............................. 369/53.16 |
| 6,477,126 B1 | * | 11/2002 | Park et al. ................. 369/59.25 |
| 6,480,446 B1 |  | 11/2002 | Ko |
| 6,564,345 B1 | * | 5/2003 | Kim et al. ..................... 714/723 |
| 6,667,939 B1 |  | 12/2003 | Miyamoto |
| 6,738,341 B2 | * | 5/2004 | Ohata et al. ................. 369/275.3 |

(Continued)

FOREIGN PATENT DOCUMENTS

CN         1328327 A       12/2001

(Continued)

OTHER PUBLICATIONS

Office Action issued by Taiwanese Patent Office in Taiwanese Application No. 93110323 on Oct. 2, 2006.

(Continued)

*Primary Examiner* — Jorge Ortiz Criado
(74) *Attorney, Agent, or Firm* — NSIP Law

(57) ABSTRACT

A recording method for use by an apparatus and/or which is encoded on a computer readable medium includes selecting a defect management on mode or a defect management off mode that indicates whether defect management is to be performed or not while data is recorded in the recording medium, recording the data in the recording medium while defect management is performed on the recording medium, if the defect management on mode is selected, and recording the data in the recording medium without defect management, if the defect management off mode is selected.

6 Claims, 13 Drawing Sheets

U.S. PATENT DOCUMENTS

| | | | |
|---|---|---|---|
| 6,937,552 | B2 | 8/2005 | Ko |
| 7,289,404 | B2 * | 10/2007 | Park et al. .................. 369/53.17 |
| 7,369,468 | B2 | 5/2008 | Hwang et al. |
| 2002/0105868 | A1 * | 8/2002 | Ko ............................. 369/47.14 |
| 2008/0130446 | A1 | 6/2008 | Hwang et al. |
| 2008/0130448 | A1 | 6/2008 | Hwang et al. |
| 2008/0279072 | A1 | 11/2008 | Kuraoka et al. |
| 2008/0298206 | A1 | 12/2008 | Takahashi et al. |

FOREIGN PATENT DOCUMENTS

| | | |
|---|---|---|
| EP | 0 350 920 | 1/1990 |
| EP | 0 908 882 | 4/1999 |
| EP | 0 952 573 | 10/1999 |
| EP | 1 100 087 | 5/2001 |
| EP | 1 132 914 | 9/2001 |
| JP | 62-080867 | 4/1987 |
| JP | 02-23417 A | 1/1990 |
| JP | 07-235139 | 9/1995 |
| JP | 07-334936 | 12/1995 |
| JP | 09-167447 | 6/1997 |
| JP | 09-251721 | 9/1997 |
| JP | 11-086418 | 3/1999 |
| JP | 11-297006 | 10/1999 |
| JP | 2000-003562 | 1/2000 |
| JP | 2001-351334 | 12/2001 |
| JP | 2002-312940 | 10/2002 |
| JP | 2004-280864 | 10/2004 |
| JP | 2005-056542 | 3/2005 |
| JP | 2006-523910 | 10/2006 |
| JP | 2008-135175 | 6/2008 |
| JP | 2008-165981 | 7/2008 |
| JP | 2008-181653 | 8/2008 |
| JP | 4584915 | 9/2010 |
| WO | WO 00/07185 | 2/2000 |
| WO | WO 00/46805 | 8/2000 |
| WO | WO 00/54274 | 9/2000 |
| WO | WO 01/22416 | 3/2001 |
| WO | 2004/077412 | 9/2004 |

OTHER PUBLICATIONS

U.S. Appl. No. 12/026,930, filed Feb. 6, 2008, Sung-hee Hwang et al., Samsung Electronics Co., Ltd.

U.S. Appl. No. 12/026,945, filed Feb. 6, 2008 Sung-hee Hwang et al., Samsung Electronics Co., Ltd.

International Search Report issued in International Patent Application No. PCT/KR2004/00862 on Jun. 29, 2004.

Substantive Examination Adverse Report issued in Malaysian Application No. PI 20041373 on Mar. 6, 2009.

Office Action issued in Chinese Patent Application No. 200710126968.9 on Jul. 10, 2009.

Office Action issued in Japanese Patent Application 2006-507805 on Aug. 4, 2009.

Office Action issued in Japanese Patent Application 2008-044909 on Aug. 4, 2009.

Office Action issued in Japanese Patent Application 2008-044910 on Aug. 4, 2009.

Office Action issued in Japanese Patent Application 2008-044911 on Aug. 4, 2009.

Canadian Office Action issued on Nov. 16, 2009, in Canadian Application No. 2520835 citing US 2002/0105868 first cited in Office Action of Mar. 5, 2009 (5 pages).

Japanese Office Action issued on Feb. 23, 2010, in corresponding Japanese Application No. 2008-044909 (3 pages).

Canadian Office Action issued on Jan. 21, 2011, in corresponding Canadian Patent Application No. 2 497 770 (3 pages).

Canadian Office Action issued on Jan. 31, 2011, in corresponding Canadian Patent Application No. 2 520 835 (5 pages).

European Search Report issued on Mar. 16, 2011, in corresponding European Patent Application No. 04727441.0 (4 pages).

Japanese Office Action issued on Feb. 22, 2011, in corresponding Japanese Patent Application No. 2010-152028 (2 pages).

Notice of Preliminary Reexamination issued by the Japanese Patent Office on May 17, 2011, in corresponding Japanese Patent Application No. 2006-507805 (5 pages).

* cited by examiner

RECORDING/REPRODUCING METHOD, RECORDING/REPRODUCING APPARATUS, OPTICAL RECORDING MEDIUM, AND COMPUTER READABLE RECORDING MEDIUM HAVING RECORDED THEREON PROGRAM FOR THE RECORDING/REPRODUCING METHOD

CROSS-REFERENCE TO RELATED APPLICATIONS

This application is a continuation of U.S. patent application Ser. No. 10/821,187, filed Apr. 9, 2004, currently pending, which claims the benefit of Korean Patent Application No. 2003-23727, Korean Patent Application No. 2003-23728 and Korean Patent Application No. 2003-23729, which were filed on Apr. 15, 2003 in the Korean Intellectual Property Office, and Korean Patent Application No. 2004-17253, filed on Mar. 15, 2004 in the Korean Intellectual Property Office, the disclosures of which are incorporated herein in their entirety by reference.

BACKGROUND OF THE INVENTION

1. Field of the Invention

The present invention relates to the field of discs, and more particularly, to a recording/reproducing method, a recording/reproducing apparatus, an optical recording medium, and a computer readable recording medium having recorded thereon a program for the recording/reproducing method.

2. Description of the Related Art

Recent years have witnessed remarkable advances in optical recording techniques (i.e., techniques for recording data on optical discs). With these advances, various types of optical disc recording/reproducing apparatuses have been developed.

Write-once optical discs are a type of optical discs to which data can be written only once. For example, conventional compact disc-recordables (CD-Rs) and digital versatile disc-recordables (DVD-Rs) are forms of the write-once optical discs. Generally, in the write-once optical discs, a state of a recording layer is changed by applying heat to a predetermined area of the recording layer using laser light to form a recording mark.

Defect management involves re-writing user data, which has been recorded in a user data area where a defect is generated, thereby compensating for data loss otherwise caused by the generation of the defect. Conventionally, defect management is classified into defect management using a linear replacement method and defect management using a slipping replacement method. In the linear replacement method, an area of a user data area where a defect is generated is replaced with an area of a spare area where a defect is not generated. In the slipping replacement method, the area where a defect is generated is slipped without using such an area and a next area where a defect is not generated is used.

In the case of the linear replacement method, a block of the user data area where a defect is generated is called a defect block and the spare area, which is a space for a replacement block for replacement of the defect block, is provided in a predetermined area of a disc.

Since the write-once optical discs cannot be overwritten, defect management methods different from those in rewritable discs may be adopted. In the case of the write-once optical discs, the above-described defect management methods may or may not be used. Thus, there is a need for a method of using the write-once optical discs based on whether defect management is used or not.

SUMMARY OF THE INVENTION

An aspect of the present invention provides a recording/reproducing method, a recording/reproducing apparatus, an optical recording medium, and a computer readable recording medium having recorded thereon a program for the recording/reproducing method, in which a write-once optical disc can be used according to whether defect management is adopted or not.

Additional aspects and/or advantages of the invention will be set forth in part in the description which follows and, in part, will be obvious from the description, or may be learned by practice of the invention.

According to an aspect of the present invention, a method of recording data on a recording medium comprises selecting a defect management mode selectable between a defect management on mode and a defect management off mode that indicates whether defect management is to be performed on the recording medium; recording the data on the recording medium while defect management is performed on the recording medium, if the defect management on mode is selected; and recording the data in the recording medium without defect management, if the defect management off mode is selected.

According to an aspect of the invention, the recording of the data in the defect management on mode comprises initializing the recording medium to the defect management on mode, the initialization comprising assigning a spare area for replacing a defect generated in a data area of the recording medium to the data area; and recording temporary defect management information including information on the assigned spare area and an identifier indicating the defect management on mode, in a temporary defect management area provided in the recording medium.

According to an aspect of the invention, the recording of the data in the defect management on mode further comprises recording a replacement block, which replaces a defect block concerning the defect generated in the data area, in the spare area in predetermined operation units; and updating the information on the defect and the defect management information for defect management as temporary defect management information in the temporary defect management area in predetermined operation units.

According to an aspect of the invention, the recording of the data in the defect management on mode further comprises changing a size of the spare area; and updating temporary defect management information including information on the changed size of the spare area in the temporary defect management area.

According to an aspect of the invention, the recording of the data in the defect management on mode further comprises converting the defect management on mode into the defect management off mode.

According to an aspect of the invention, the conversion into the defect management off mode comprises reinitializing the recording medium to the defect management off mode; and recording the data in the recording medium without defect management.

According to an aspect of the invention, the reinitialization to the defect management off mode comprises recording the identifier indicating the defect management off mode in the temporary defect management area; and recording temporary defect management information that is finally updated in the temporary defect management area in a defect management area provided in the recording medium.

According to an aspect of the invention, the recording method further comprises finalizing the recording medium, where the finalization of the recording medium comprises recording a finalization flag indicating the finalization of the recording medium in the temporary defect management area; recording temporary defect management information including finally updated information on the defect and defect management information in the temporary defect management area in a defect management area provided in the recording medium; and filling with predetermined data a remaining area of the temporary defect management area where the data is not recorded.

According to an aspect of the invention, the recording of the data in the defect management off mode comprises recording the data in the data area provided in the recording medium in predetermined operation units; and updating recording management information according to the recording of the data in a temporary defect management area provided in the recording medium.

According to an aspect of the invention, the recording method further comprises finalizing the recording medium, where the finalization of the recording medium comprises recording a finalization flag, which indicates the recording medium is finalized, in the temporary defect management area; recording management information finally updated in the temporary defect management area in a defect management area provided in the recording medium; and filling with predetermined data a remaining area of the temporary defect management area where no data was recorded.

According to another aspect of the present invention, a method of reproducing data recorded on a recording medium, which includes a lead-in area, a data area, and a lead-out area consecutively arranged, comprises reading defect management on/off mode information, which indicates whether defect management was performed on the recording medium, from a temporary defect management area provided in the lead-in area or the lead-out area, so as to update information on a defect generated in the data area and defect management information for management of the defect for every predetermined operation and reading data recorded in the data area based on the read defect management on/off mode information.

According to an aspect of the invention, the reproducing method further comprises reading finally updated information on the defect and finally updated defect management information from the temporary defect management area, if the read defect management on/off mode information is a defect management on mode.

According to an aspect of the invention, the reproducing method further comprises reading a finalization flag, which indicates the recording medium is finalized, from the temporary defect management area; and reading the finally updated information on the defect and the finally updated defect management information from a defect management area provided in the recording medium.

According to an aspect of the invention, the reproducing method further comprises reading final recording management information from the temporary defect management area, if the read defect management on/off mode information is a defect management off mode.

According to an aspect of the invention, the reproducing method further comprises reading the finalization flag, which indicates the recording medium is finalized, from the temporary defect management area; and reading the finally updated information on the defect and the finally updated defect management information from the defect management area provided in the recording medium.

According to another aspect of the present invention, an apparatus for reproducing and/or recording data on a recording medium comprises a recording/reading unit, which transfers the data with respect to the recording medium; and a control unit, which selects a defect management mode as one of a defect management on mode and a defect management off mode that indicates whether defect management is to be performed while data is recorded on the recording medium, and controls the recording/reading unit to record the data in the recording medium while defect management is performed on the recording medium, if the defect management on mode is selected and record the data in the recording medium without defect management, if the defect management off mode is selected.

According to another aspect of the present invention, an apparatus for recording and/or reproducing data recorded on a recording medium, which includes a lead-in area, a data area, and a lead-out area consecutively arranged, comprises a reading unit, which transfers data with respect to the recording medium; and a control unit, which controls the reading unit to read defect management on/off mode information, which indicate whether defect management was performed on the recording medium, from a temporary defect management area provided in the lead-in area or the lead-out area, so as to update information on a defect generated in the data area and defect management information for management of the defect for every predetermined recording operation, and controls the reading unit to read data recorded in the data area based on the read defect management on/off mode information.

According to another aspect of the present invention, an optical recording medium includes a lead-in area, a data area, and a lead-out area consecutively arranged, a temporary defect management area for recording temporary information on a defect generated in the data area, where the lead-in area or the lead-out area and temporary defect management information are for management of the defect, and a defect management area for recording final information on the defect and final defect management information and which are in the lead-in area or the lead-out area, where the temporary defect management information recorded in the temporary defect management area includes defect management on/off mode information that indicates to a recording and/or reproducing apparatus whether data is to be recorded on the recording medium while defect management is performed on the recording medium.

According to an aspect of the invention, if the recording medium is initialized to the defect management on mode, a spare area is assigned to the data area by the apparatus for recording a replacement block that replaces a defect block concerning a defect generated in the data area of the recording medium in predetermined recording operation units, the defect management area is empty, and the temporary defect management area enters a state where the information on the defect and the defect management information for management of the defect can be updated in predetermined recording operation units.

According to an aspect of the invention, if the size of the spare area of the recording medium is changed and the recording medium is reinitialized, information on the changed size of the spare area is recorded in the temporary defect management area.

According to an aspect of the invention, if the recording medium is reinitialized to a defect management off mode, information indicating the defect management off mode is recorded in the temporary defect management area and temporary defect management information finally updated in the temporary defect management area is recorded in the defect management area.

According to an aspect of the invention, when the recording medium is finalized, a finalization flag, which indicates the recording medium is finalized, is recorded in the temporary defect management area, temporary defect management information finally recorded in the temporary defect management area is recorded in the defect management area, and predetermined data fills in a remaining area of the temporary defect management area where no data is recorded.

According to an aspect of the invention, if the recording medium is initialized to the defect management off mode, the defect management area is empty and the temporary defect management area enters a state where recording management information according to the recording of the data in the data area can be updated in predetermined recording operation units.

According to another aspect of the present invention, a computer readable recording medium encoded with programming instructions for implementing a method of recording data on a recording medium performed by a computer, the method comprising selecting a defect management mode as one of a defect management on mode and a defect management off mode that indicates whether defect management is to be performed on the recording medium; recording the data in the recording medium while defect management is performed on the recording medium, if the defect management on mode is selected; and recording the data in the recording medium without defect management, if the defect management off mode is selected.

According to another aspect of the present invention, a computer readable recording medium encoded with processing instructions for implementing a method of reproducing data recorded on a recording medium, which has a lead-in area, a data area, and a lead-out area consecutively arranged, as performed by a computer the method comprising reading defect management on/off mode information, which indicates one of whether defect management is performed on the recording medium and whether defect management is not performed, from a temporary defect management area provided in the lead-in area or the lead-out area, so as to update information on a defect generated in the data area and defect management information for management of the defect for every predetermined recording operation and reading data recorded in the data area based on the read defect management on/off mode information.

BRIEF DESCRIPTION OF THE DRAWINGS

These and/or other features and advantages of the present invention will become more apparent and more readily appreciated by describing in detail exemplary embodiments thereof with reference to the accompanying drawings in which.

DETAILED DESCRIPTION OF THE EMBODIMENTS

Figure 1:
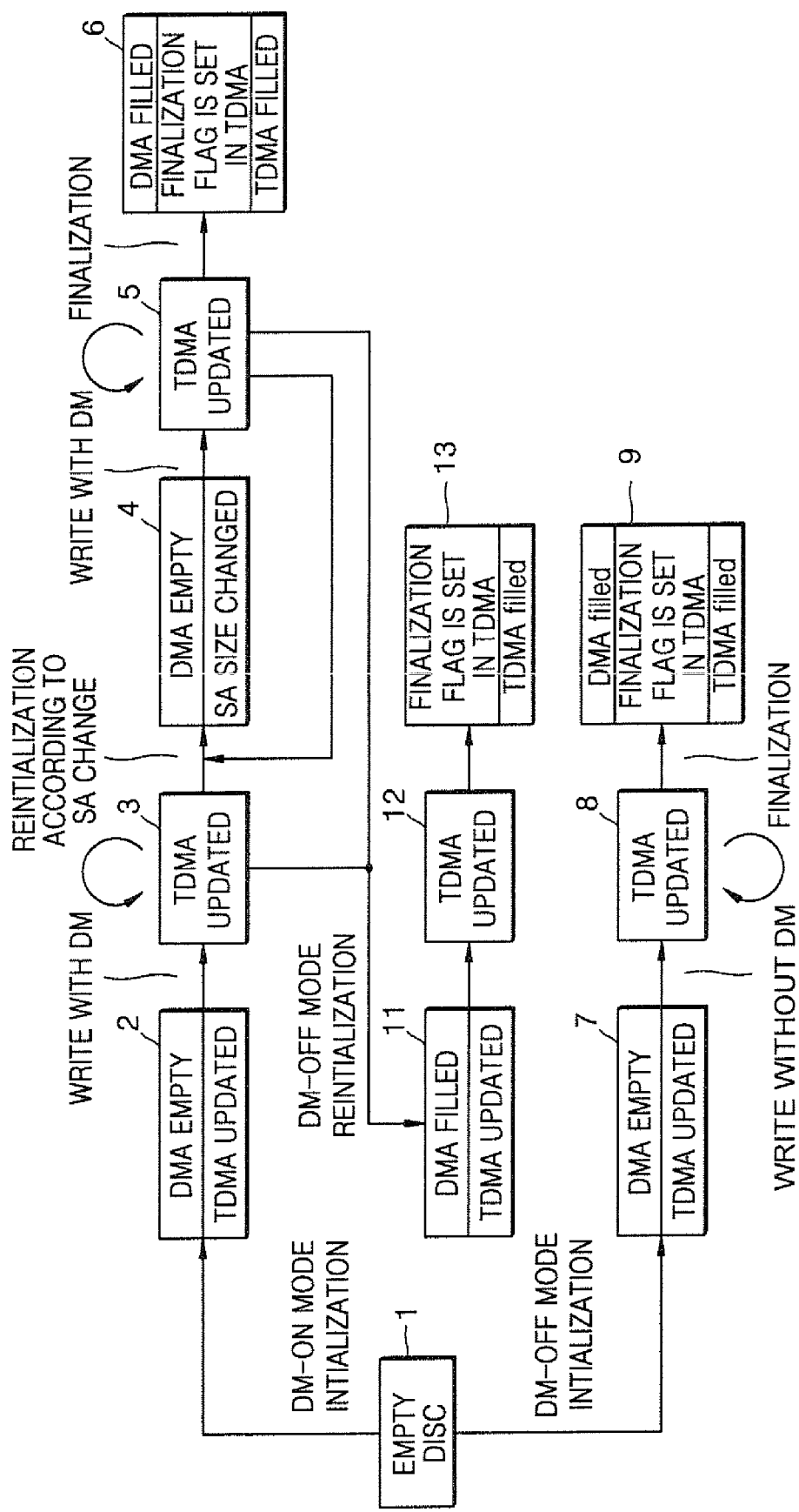
FIG. 1 is a state diagram of a write-once recording medium according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a state diagram of a write-once recording medium according to an aspect of the present invention and shows the life of the write-once recording medium ranging from initialization to finalization according to a DM-on mode or a DM-off mode. The write-once recording medium according to an aspect of the present invention can be used in two modes according to whether defect management is used or not. The first mode is the DM-on mode in which data is recorded on a recording medium while defect management is performed on the recording medium. The second mode is the DM-off mode in which data is recorded on a recording medium while defect management is not performed.

In the DM-on mode, a spare area is assigned to a data area provided on a recording medium and data is recorded by a drive device on the recording medium while defect management and is performed with the intention of a user or a drive manufacturer. In the DM-off mode, data is recorded by a drive device on a recording medium without defect management, where the recording is performed with the intention of a user or a drive manufacturer. Since the spare area assigned to a part of the data area is provided for defect management and since to defect management is performed in the DM-off mode, it is natural that a spare area be not assigned in the DM-off mode. While FIG. 1 is shown without a reinitialization from the DM-off mode to the DM-on mode, it is understood that such a reinitialization from the DM-off mode to the DM-on mode is possible to the extent that the DMA is not filled prior to finalization.

DM-On Mode

Figure 2:
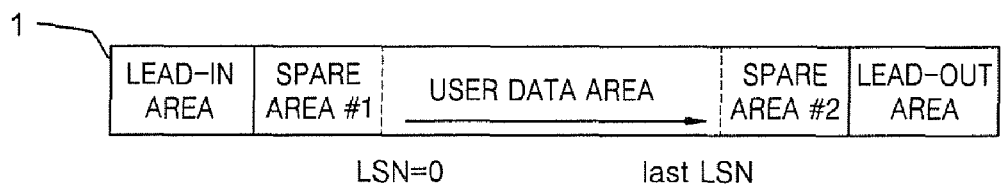
FIG. 2 is a data structure diagram of a single recording layer recording medium according to an embodiment of the present invention.
Figure 3:
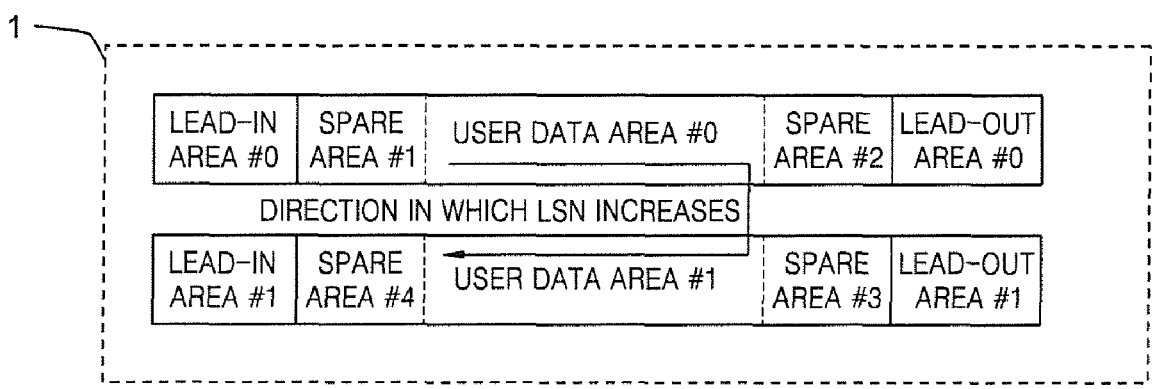
FIG. 3 is a data structure diagram of a double recording layer recording medium according to an embodiment of the present invention.

The life of the write-once optical medium according to the DM-on mode is shown in an upper part of FIG. 1. In the following description, terms "disc" and "recording medium" are interchangeable and are not limited to a specific type of medium. When a disc manufactured by a disc manufacturer is first used, the disc is an empty disc 1 on which no data is written. However, the empty disc 1 includes a lead-in area, a data area, and a lead-out area that are assigned during disc manufacturing. The structure of the empty disc 1 is shown in FIGS. 2 and 3. The spare area shown in FIGS. 2 and 3 are not assigned during disc manufacturing, but are assigned during disc initialization. Also, assignment of the spare area depends on whether defect management is performed on the disc 1 or not. Thus, the spare area is represented using dotted lines.

If it is determined that the empty disc 1 is to be used according to the DM-on mode, the empty disc 1 is initialized to the DM-on mode. For defect management, the spare area is assigned to the data area of the empty disc 1 and initialization information for defect management is recorded in a predetermined area of the empty disc 1. Assignment of the spare area will be described with reference to FIGS. 2 and 3.

FIG. 2 is a data structure diagram of a single recording layer recording medium version of the disc 1 according to an aspect of the invention. Referring to FIG. 2, a lead-in area, a data area, and a lead-out area are provided in succession in the single recording layer. The lead-in area, the data area, and the lead-out area are assigned during disc manufacturing. If defect management by a drive device is performed on the disc 1 during initialization for use of the disc 1, a spare area is assigned to the data area. Referring to FIG. 2, two spare areas are assigned to the data area and the data area includes a spare area #1, a user data area, and a spare area #2. Data recording begins in a location having a logical sector number (LSN) 0 of the user data area and progresses towards a location having the last LSN. While not required in all aspects, the spare area #2 is used after the spare area #1 is completely written to (i.e., filled). In the spare area #2, if recording progresses in the direction from the lead-out area to the user data area, size change of the spare area #2 like extension or reduction can be easily performed.

Figure 4:
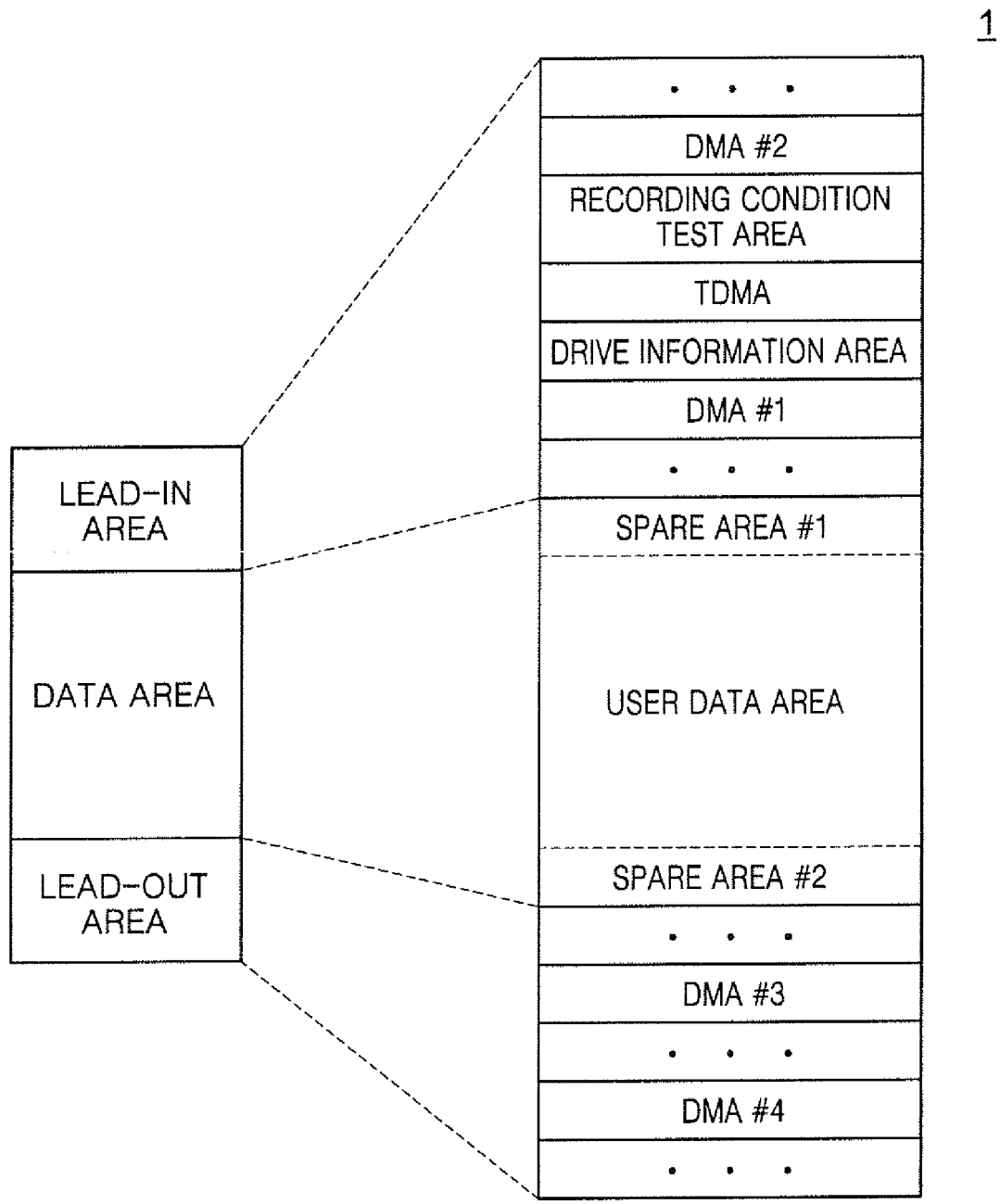
FIG. 4 is a detailed data structure diagram of areas of the write-once recording medium according to an embodiment of the present invention.

FIG. 3 is a data structure diagram of a double recording layer recording medium version of the disc 1 according to an aspect of the present invention. The structure of the double recording layer recording medium is similar with that of the single recording layer recording medium 1 shown in FIG. 2. One layer of the double recording layer recording medium 1 includes a lead-in area #0, a data area #0, and a lead-out area #0 in succession. The other layer includes a lead-in area #1, a data area #1, and a lead-out area #1 in succession. It is determined that defect management by a drive device is to be performed during disc initialization. Thus, the spare areas #1 and #2 are assigned to the data area #0, and spare areas #3 and #4 are assigned to a data area #1. In other words, the data area #0 includes the spare area #1, the user data area #0, and the spare area #2 and the data area #1 includes the spare area #3, the user data area #1, and the spare area #4. To facilitate extension of the spare area #4, it is desirable, but not required to use the disc 1 such that an LSN increases in the direction from the user data area #0 to the user data area #1, as shown in FIG. 4.

The detailed structures of the lead-in area and lead-out area of the recording medium 1 shown in FIGS. 2 and 3 will be described with reference to FIG. 4. FIG. 4 is a detailed data structure diagram of areas of the write-once recording medium 1 according to an aspect of the present invention. Referring to FIG. 4, as described above, the write-once recording medium 1 includes the lead-in area, the data area, and the lead-out area in succession and the spare areas #1 and #2 are assigned to the data area during disc initialization for defect management. The lead-in area includes a defect management area (DMA) #1, a drive information area, a temporary defect management area (TDMA), a recording condition test area, and a DMA #2. The lead-out area includes a DMA #3 and a DMA #4. Naturally, detailed areas assigned to the lead-in area can also be assigned to the lead-out area in addition to or instead of the lead-in area.

The spare areas #1 and #2 are provided to rewrite data in a replacement block that replaces a block of the user data area when a defect is generated in the data recorded in the user data area. The drive information area is provided to record information on a drive device that loads a disc and records data in or reads data from the disc 1. The recording condition test area is provided to allow the drive device to perform a predetermined test for the purpose of searching for the optimal condition for recording/reproducing data in the loaded disc.

The DMA is provided to record defect information and defect management information (DMI). The DMA includes a disc definition structure (DDS) for the DMI and a defect list (DFL) for the defect information and is provided for compatibility with rewritable recording media or to read and record final defect information and DMI recorded in the TDMA during disc finalization.

The TDMA is written to while temporary defect management information is updated. The temporary defect management information includes the temporary defect definition structure, a space bit map (SBM) that indicates recording or non-recording in blocks of a physical available space of a disc using bit values, and a temporary defect list (TDFL) for the temporary defect information. In other words, the TDMA is provided to record temporary defect management information (TDMI) including temporary disc definition structure (TDDS), the SBM, and the TDFL.

The TDMA is specially prepared to implement defect management by a drive device in the write-once recording medium. Specifically, in rewritable recording media, the DMA is only provided and the TDMA is not additionally provided. This is because the write-once recording medium cannot be overwritten as can a rewritable medium. Unlike rewritable recording media, since the write-once recording medium cannot be overwritten when the DMI is to be updated, a new area where updated information is to be written is required. Thus, a relatively large number of areas are required in proportion to the number of times the DMI is updated. However, since the DMA is not large in rewritable recording media, the TDMA is additionally provided in the write-once recording medium and the DMI is updated in the TDMA. Also, during disc finalization, finally updated TDMI in the TDMA (i.e., the TDMI as of a last recording operation) is recorded in the DMA as the DMI. By recording the DMI in the DMA provided in the write-once recording medium, compatibility with rewritable recording media can be achieved. For convenience of explanation, the DMI updated in the TDMA is referred to as "TDMI" and final TDMI recorded in the DMA is referred to as "DMI".

Figure 5:
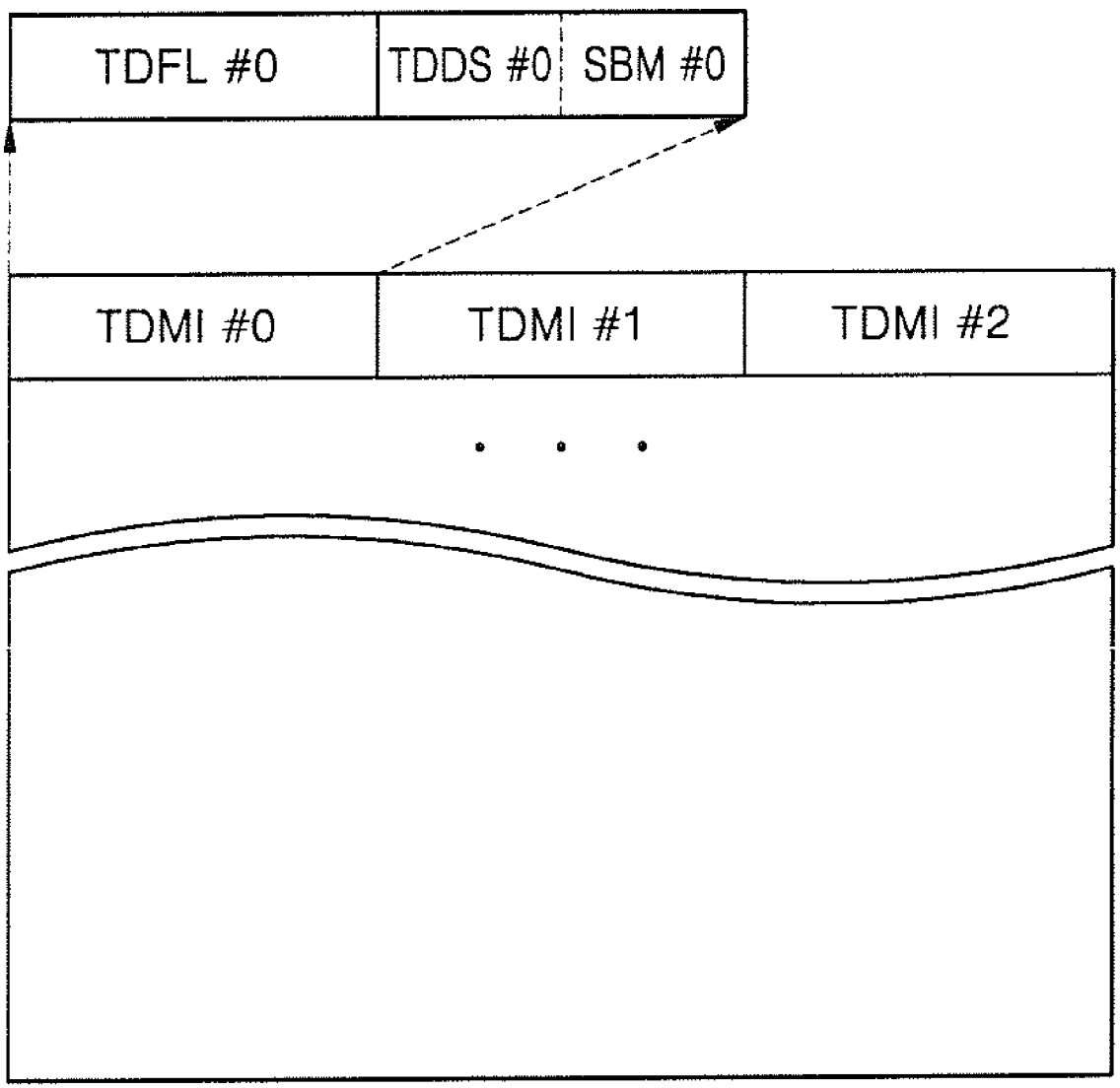
FIG. 5 is a view for explaining temporary disc management information recorded in a temporary disc management area according to an embodiment of the present invention.
Figure 6:
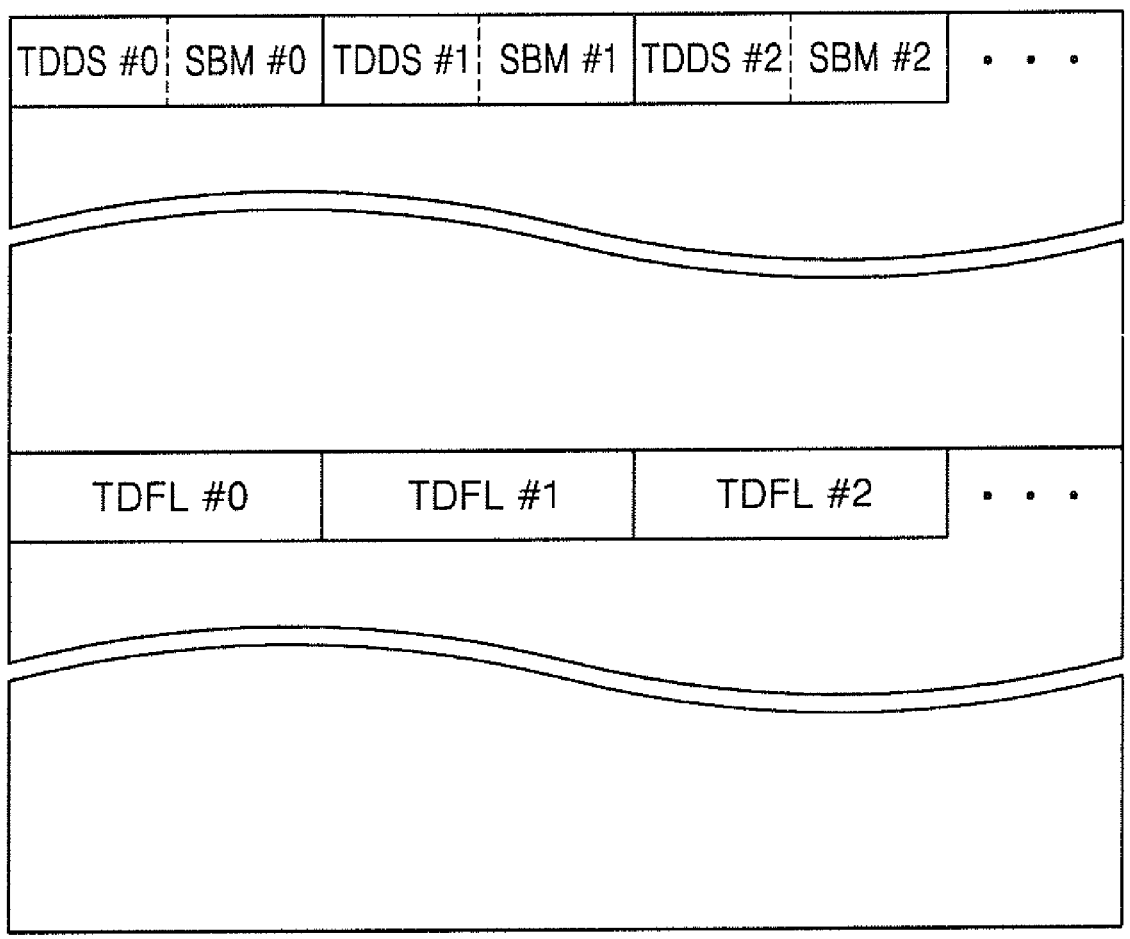
FIG. 6 is a view for explaining temporary disc management information recorded in a temporary disc management area according to an embodiment of the present invention.

Hereafter, the TDMI recorded in the TDMA will be described in detail. The TDMI includes the TDDS, the SBM, and the TDFL. When the TDDS, the SBM, and the TDFL are recorded in the TDMA, the TDDS and the SBM may be recorded in the same block and the TDFL may be recorded in another block. For example, as shown in FIG. 5, the TDMI includes a TDMI #0 composed of a TDFL #0, a TDDS #0, and an SBM #0 and can be updated in units of TDMI # i in the TDMA. As another example, as shown in FIG. 6, the TDMA is divided into two parts, a TDDS # i and an SBM # i may be updated as one block in one part, and a TDFL #i may be updated as one block in another part. The detailed structure of the TDDS # i will be described with reference to FIG. 7.

Figure 7:
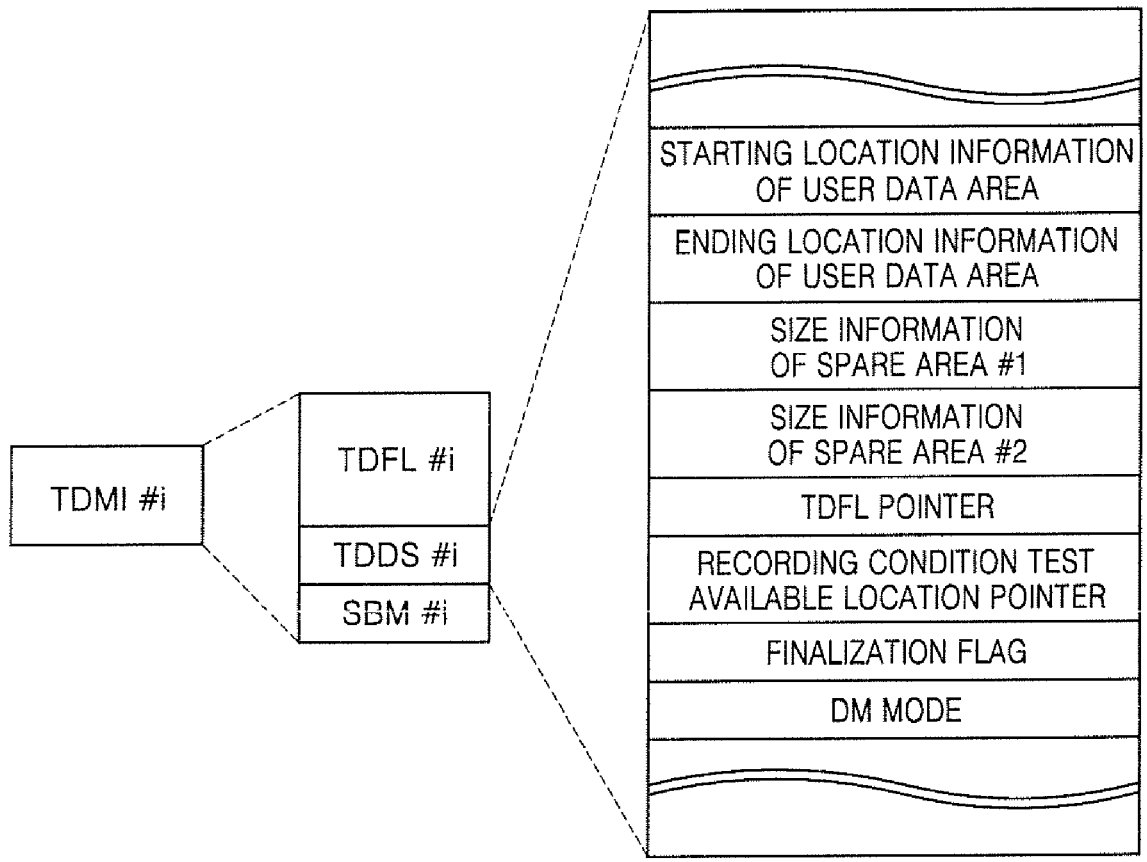
FIG. 7 is a detailed data structure diagram of a temporary defect definition structure (TDDS) # i of the temporary disc management information according to an embodiment of the present invention.

FIG. 7 is a detailed data structure diagram of the TDDS # i of the TDMI according to an aspect of the present invention. Referring to FIG. 7, the TDDS # i includes starting location information of the user data area, ending location information of the user data area, size information of the spare area #1, size information of the spare area #2, a TDFL pointer, a recording condition test available location pointer, a finalization flag, and a DM mode.

The location and size of the user data area assigned to the data area and the locations of the spare areas #1 and #2 can be obtained from the starting location information of the user data area and the ending location information of the user data area. The size location of the spare area #1 and the size information of the spare area #2 are recorded as the TDDS and the size information of the spare area #1 or #2 is changed if the spare area #1 or #2 is enlarged or reduced. The TDFL pointer indicates location information of a recently updated TDFL. By using the TDFL pointer, a finally updated TDFL can be easily found.

The recording condition test available location pointer indicates location information of the recording condition test area provided in the lead-in area or the lead-out area of the disc, in which a test can be performed. By referring to the recording condition test available location pointer, a location where a test can be performed can be easily found without direct scanning of the recording condition test area.

The finalization flag is a flag for setting disc finalization and it is possible to determine using the finalization flag whether a disc is finalized or not. Although the finalization flag is provided in the TDDS # i in FIG. 7, the finalization flag may be provided in the SBM # i as shown in FIG. 8.

A DM mode of FIG. 7 indicates whether defect management is performed on a corresponding disc 1 or not. For example, when data is recorded on the disc while defect management is performed on the disc 1, the DM mode is set to the DM-on mode, and when data is recorded on the disc 1 while defect management is not performed, the DM mode is set to the DM-off mode.

Figure 8:
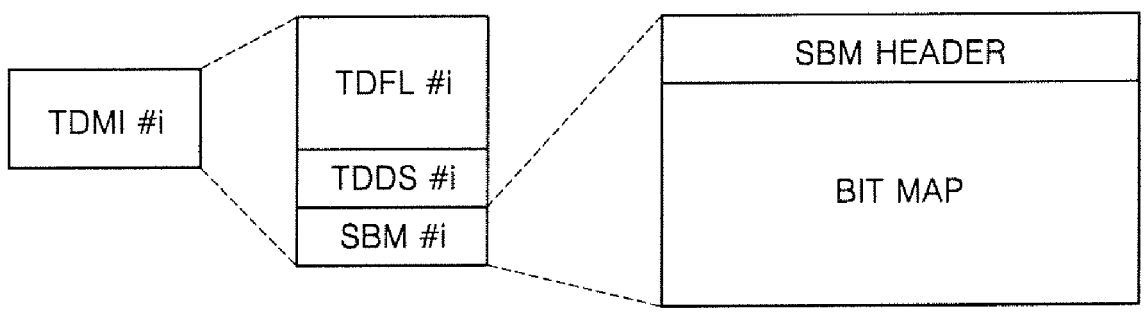
FIG. 8 is a detailed data structure diagram of a space bit map (SBM) # i of the temporary disc management information according to an embodiment of the present invention.

FIG. 8 is a detailed data structure diagram of the SBM # i of temporary disc management information according to an aspect of the present invention. Referring to FIG. 8, the SBM # i includes an SBM header and a bit map. The SBM header is an identifier indicating the SBM. The bit map is an information map that indicates recording or non-recording in a block of a physically recordable area of the disc using bit values. For example, a block where data is recorded is represented by "1" and a block where data is not recorded is represented by "0". In this way, it is possible to know recording or non-recording in each bock.

Figure 9:
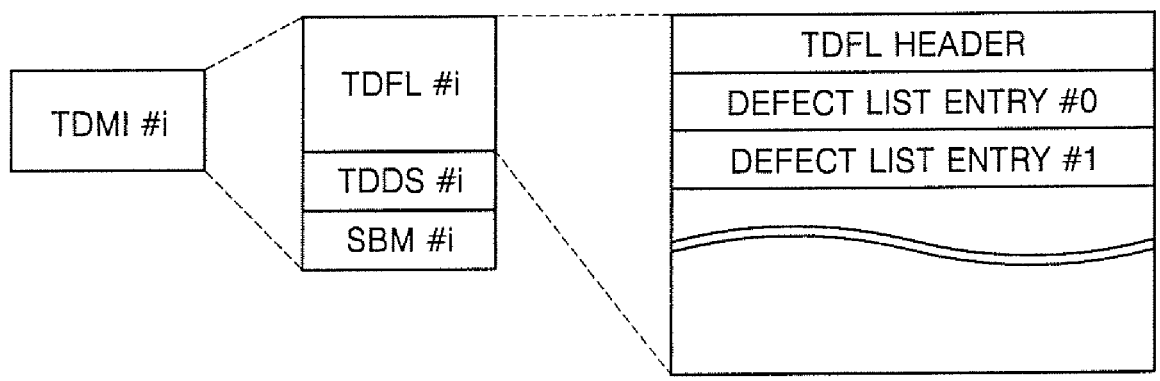
FIG. 9 is a detailed data structure diagram of a temporary defect list (TDFL) # i of the temporary disc management information according to an embodiment of the present invention.
Figure 10:
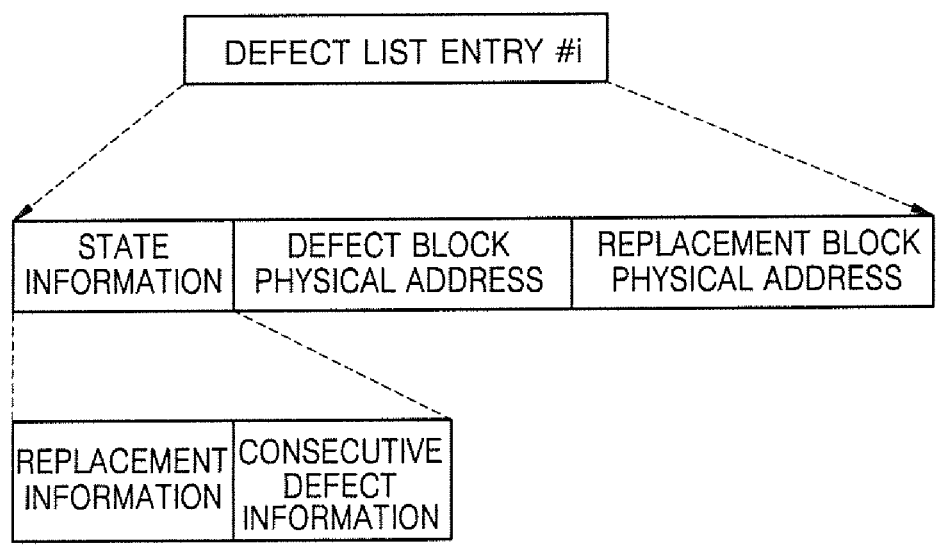
FIG. 10 is a data structure diagram of a defect list entry # i shown in FIG. 9.

FIG. 9 is a detailed data structure diagram of the TDFL # i of the temporary disc management information according to an aspect of the present invention. Referring to FIG. 9, the TDFL # i includes a TDFL header, a defect list entry #0, a defect list entry #1, . . . . The TDFL header is an identifier indicating the TDFL. The defect list entry # i indicates information on a defect generated in the user data area. FIG. 10 shows a data structure of the defect list entry # shown in FIG. 9.

Referring to FIG. 10, the defect list entry # i includes state information, a defect block physical address, and a replacement block physical address. The defect block physical address indicates a physical address of a defect block of the user data area and the replacement block physical address indicates a physical address of a replacement block of the spare area, which replaces the defect block. The state information indicates if the replacement information and consecutive defect information. The replacement information indicates whether the defect block has a replacement block. In other words, there is a state of the defect block having a replacement block and a state of the defect block having no replacement block. The consecutive defect information indicates a state of the defect block when a defect generated in the user data area is generated in consecutive blocks. In other words, when a defect is generated in consecutive blocks in the user data area, a defect list entry for each of the consecutive blocks is not made, but the first defect entry of the first defect block among the consecutive blocks and the last defect entry of the last defect block among the consecutive blocks are only made. Thus, it is possible to save the space of the TDFL.

Hereto, an exemplary structure of a recording medium to which the present invention can be applied is described. Referring back to FIG. 1, after initialization to the DM-on mode of the empty disc 1, the DMA of the disc is empty and the TDMA enters a state 2 where the TDMA can be updated. Update of the TDMA indicates that the TDMI is updated in the TDMA. Such update is performed in units of predetermined recording operation that may be one verify-after-write unit or a plurality of verify-after-write units in which a block is recorded and then verified or eject units according to an aspect of the invention. Here, a block means an error correction code (ECC) unit recorded in the disc. However, it is understood that other update methods can be used and/or performed other than in units of recording operations.

Data is recorded in the disc 1 of the state 2 while defect management by a drive device is performed on the disc. Then, the TDMA as shown in FIG. 4 maintains a state 3 where the TDMI is updated according to data recording simultaneously with defect management. While using the disc 1 of the state 3, if any change occurs in the spare area, the disc 1 is reinitialized, the size information of the spare area of the TDMI is changed, the changed size information of the spare area is recorded in the TDMA, and the DMA is still empty. If the spare area assigned during disc initialization is entirely consumed and the spare area needs to be enlarged, or if the user data area lacks an area that data is to be written to and the spare area needs to be reduced, the size information of the spare area is changed during use of the disc 1 (state 4). The TDDS # i including such changes is recorded in the TDMA. Even after the size of the spare area is changed, data is recorded in the disc 1 while defect management by the drive device is performed on the disc, and the TDMA is updated (state 5).

The disc 1 may be reinitialized to the DM-off mode during data recording simultaneously with defect management. When the disc 1 is reinitialized to the DM-off mode, for compatibility with rewritable recording media, final TDDS and TDFL information recorded in the TDMA are recorded as DDS and DFL information in the DMA and the TDMA is changed into the DM-off mode. In other words, an update is made in the TDDS shown in FIG. 7 by setting the DM mode to the DM-off mode and finally updated TDDS # n and TDFL # n in the TDMA are copied and recorded in the DMA (states 11 through 13).

Specifically, after being reinitialized to the DM-off mode, the DMA of the disc 1 is filled in and the TDMA enters the state 11 where the TDMA can be updated. Since the DM mode is changed into the DM-off mode, data is recorded without defect management and the TDMA is updated (state 12). Since defect management is not performed, the update of the TDMA mainly concerns the TDDS # i and the SBM # i.

However, if contents unrelated to defect management are included in the TDFL # i, the TDFL # i may also be updated. While the disc 1 is used in this way, if the disc 1 is finalized, the TDMA is filled in and enters the state 13 where the finalization flag is set in the TDMA (state 13).

While data is recorded in the disc of the state 5 and defect management by the drive device is performed on the disc 1, if the disc is finalized, the finalization flag is set in the TDMA to prevent the disc from being used after finalization, and finally updated TDMI in the TDMA, (i.e., TDDS # m and TDFL # m fill in the DMA and serve as final DMI) (state 6). With reference to the embodiment in FIG. 7, the finalization flag is set to "1" to indicate finalization in the TDDS and the TDDS is recorded in the TDMA to indicate the disc is finalized. Also, to prevent the TDMI from being updated in the TDMA, predetermined bits (e.g., "FFh)", may fill in a remaining area of the TDMA where data is not recorded. As a result, the TDMA is filled in.

DM-Off Mode

The life of the write-once optical medium according to the DM-off mode is shown in a lower part of FIG. 1. If it is determined that the disc 1 is to be used according to the DM-off mode, the empty disc 1 is initialized to the DM-off mode. The DMA of the disc initialized to the DM-off mode is empty and the TDMA enters a state 7 where the TDMA can be updated. The TDDS recorded as initial information in the TDMA during disc initialization includes starting location information of the user data area and ending location information of the user data area the size information of the spare area #1 and the size information of the spare area #2 are recorded as "0". Also, the DM mode is set to the DM-off mode.

Since defect management is not performed during data recording, the TDDS and the SBM are mainly updated in the TDMA. Since defect management is not performed, detailed data of the TDDS used in the DM-off mode may be different. To differentiate the TDDS and the SBM used in the DM-off mode from those used in the DM-on mode, the TDDS and the SBM used in the DM-off mode are called recording management information.

In the DM-off mode, data is recorded in the disc 1 without defect management by a drive device and the TDMA maintains a state 8 where the TDMA can be updated. When the disc 1 is finalized, the finalization flag is set in the TDMA so as to prevent the disc 1 from being used after finalization (state 9). Also, the final TDMI (i.e., recording management information) updated in the TDMA fills in the DMA and serves as final DMI (state 9). The finalized disc 1 has a state where the finalization flag indicating finalization is set in the TDDS or the SBM recorded in the TDMA, the TDDS and the SBM that are finally updated in the TDMA are recorded as DMI in the DMA, and equivalent values to "FFh" are recorded in a remaining area where the SBM can be recorded (i.e., the remaining area of the TDMA) so as to prevent data from being recorded in the remaining area of the TDMA.

Figure 11:
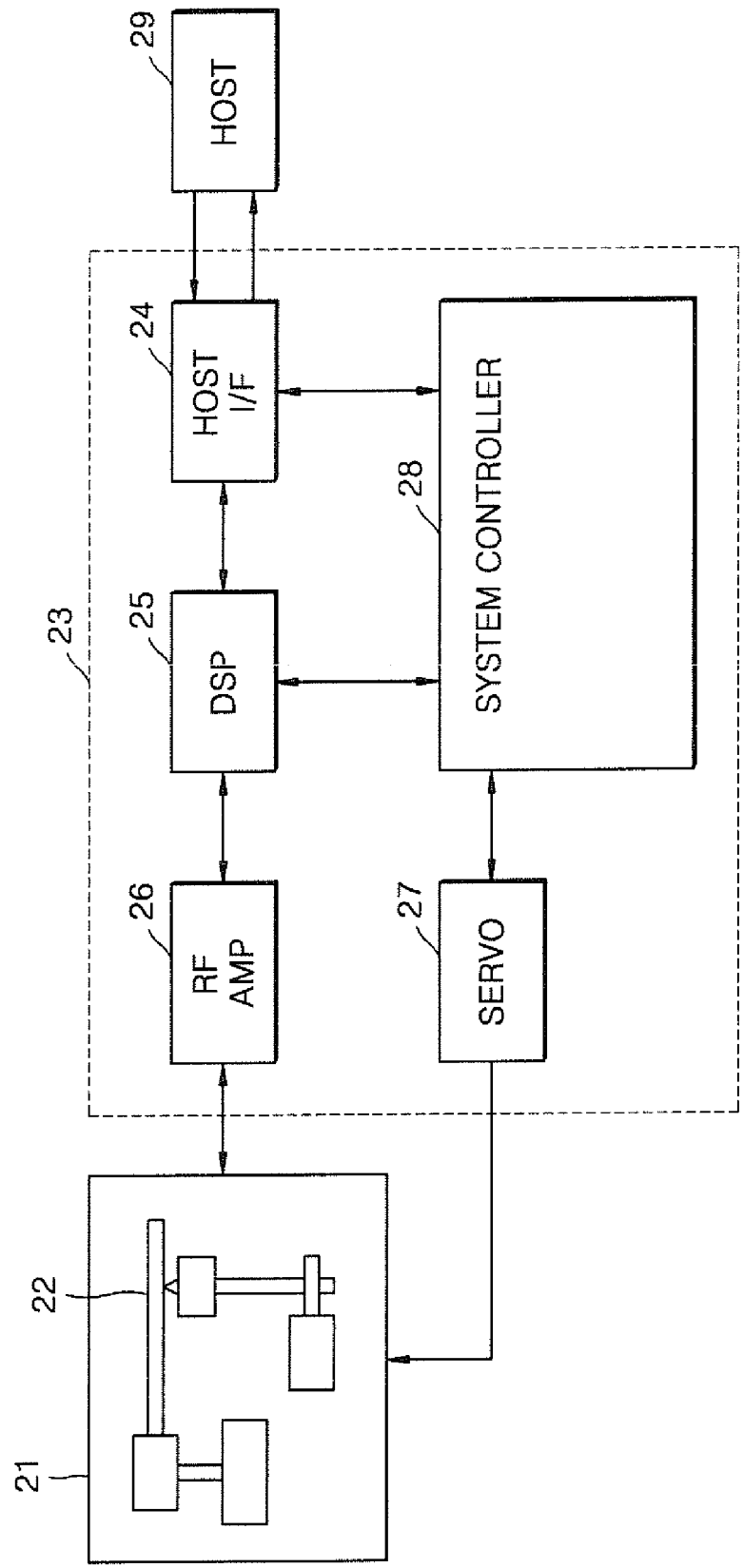
FIG. 11 is a schematic block diagram of a recording/reproducing apparatus according to an embodiment of the present invention.

Hereinafter, a recording/reproducing apparatus that makes it possible to use the above-described disc will be described with reference to FIG. 11. FIG. 11 is a schematic block diagram of a recording/reproducing apparatus according to the present invention. Referring to FIG. 11, the recording/reproducing apparatus includes a recording/reading unit 21 and a control unit 23. The recording/reading unit 21 includes a pickup to record data on a disc 22, which is an optical recording medium according to an aspect of the present invention and/or, and reads data recorded on the disc 22. The control unit 23 controls the recording/reading unit 21 to record data on and read data from the disc 22 according to an aspect of a predetermined file system. In particular, according to the present invention, the control unit 23 determines whether to perform defect management during data recording when the empty disc 22 is loaded in the recording/reading unit 21 and initializes the disc 22 according to a result of the determination. Also, the control unit 23 controls the recording/reading unit 21 to recoded data in the disc 22 according to the result of determination as described below in greater detail.

The control unit 23 includes a host I/F 24, a DSP 25, an RF AMP 26, a servo 27, and a system controller 28. During data recording, the host I/F 24 receives a predetermined recording command from a host 29 and transmits the predetermined recording command to the system controller 28. The system controller 28 controls the DSP 25 and the servo 27 to execute the predetermined recording command received from the host I/F 24. The DSP 25 adds additional data, such as parity to data received from the host I/F 24 for error correction, creates error correction blocks (i.e., ECC blocks) by performing error correction code (ECC) encoding on the data, and modulates the ECC blocks in a predetermined way. The RF AMP 26 converts data output from the DSP 25 into RF signals. The recording/reading unit 21 includes the pickup to record the RF signals transmitted from the RF AMP 26 on the disc 22. The servo 27 receives a command necessary to servo control from the system controller 28 and servo controls the pickup of the recording/reading unit 21.

In particular, according to an aspect of the present invention, the system controller 28 determines whether to use the disc 22 in the DM-on mode or the DM-off mode. Such determination indicates whether defect management is to be performed while data is recorded in the disc 22. While not required in all aspects of the invention, the system controller 28 detects input from a user or detects input from the drive manufacturer and uses the detected input to determine whether the disc 22 is in the DM-on mode or the DM-off mode. However, it is understood that the input can be otherwise received.

If the system controller 28 determines to use the disc 22 in the DM-on mode, the controller 28 controls the recording/reading unit 21 to perform defect management while data is recorded on the disc 22. In other words, the system controller 28 controls the recording/reading unit 21 to record a replacement block, which replaces a defect block of a user data area of the recording medium where a defect is generated, in a spare area of the recording medium 22 in predetermined operation units to and update information on the defect and TDMI for management of the defect in a TDMA of the recording medium in predetermined operation units. The system controller 28 further changes the size of the spare area while the disc 22 is used in the DM-on mode as needed. The system controller 28 controls the recording/reading unit 21 to record information on the changed size of the spare area (if any) in the TDMA.

Even if the disc 22 is set to the DM-on mode during disc initialization, the system controller 28 can convert the DM mode of the disc 22 into the DM-off mode while the disc 22 is used in the DM-on mode. For such conversion, the system controller 28 reinitializes the disc 22 to the DM-off mode and controls the recording/reading unit 21 to record data in the disc 22 without defect management. In other words, during reinitialization, the system controller 28 controls the recording/reading unit 21 to record information indicating that the disc 22 is used in the DM-off mode in the TDMA and to record TDMI finally updated in the TDMA in the DMA provided in the recording medium 22.

When the disc 22 used in this way is finalized, the system controller 28 controls the recording/reading unit 21 to record the finalization flag indicating that the recording medium 22 is finalized in the TDMA, to record the TDMI finally updated in the TDMA in a disc management area (DMA) provided in the recording medium 22 as the DMI, and to fill with predetermine data a remaining area of the TDMA that is not written to.

When the system controller 28 determines to use the disc 22 in the DM-off mode, it controls the recording/reading unit 21 to record data in the disc 22 without defect management. In other words, the system controller 28 controls the recording/reading unit 21 to record data in the user data area provided in the disc 21 in predetermined operation units and update recording management information according to such recording in a temporary defect management area provided in the disc 21. Also, in the same way as in the DM-on mode, when the disc 22 is finalized, the system controller 28 controls the recording/reading unit 22 to record the finalization flag, which indicates that the disc 22 is finalized, in the TDMA, record the TDMI finally updated in the TDMA in a disc management area provided in the disc 22, and fill with predetermined data in a remaining area of the TDMA that is not written to.

During reproduction, the host I/F 24 receives a reproduction command from the host 29. The system controller 28 performs initialization necessary to reproduction. The recording/reading unit 21 projects laser beams onto the disc 22 and outputs a light signal obtained by receiving the laser beams reflected off the disc 22. The RF AMP 26 converts the light signal output from the recording/reading unit 21 into an RF signal, provides modulated data obtained from the RF signal to the DSP 25, and provides a servo signal for control, obtained from the RF signal, to the servo 27. The servo 27 receives the servo signal from the RF AMP 26 and a command necessary to servo control from the system controller 28 and performs servo control on the pickup. The host I/F 24 transmits data received from the DSP 25 to the host 29.

In particular, according to an aspect of the present invention, the system controller 28 controls the recording/reading unit 21 to read mode information from the TDMA provided in the disc 22 and read data recorded in the data area based on the read information. When the read mode information is the DM-on mode, the system controller 28 controls the recording/reading unit 21 to read finally updated information on the defect and defect management information from the TDMA, and if the finalization flag, which indicates the recording medium 22 is finalized, is read from the TDMA, the system controller 28 controls the recording/reading unit 28 to read finally updated information on the defect and defect management information from the DMA provided in the disc 22.

When the read mode information is the DM-off mode, the system controller 28 controls the recording/reading unit 21 to read the final recording management information from the TDMA. If the finalization flag, which indicates the recording medium 22 is finalized, is read from the TDMA, the system controller 28 controls the recording/reading unit 21 to read finally updated recording management information from the DMA provided in the disc 22.

FIGS. 12A through 12E are flowcharts illustrating a method of using the write-once recording medium in the DM-on mode or the DM-off mode, according to an aspect of the present invention.

While not required in all aspects, the method in FIGS. 12A through 12E can be implemented as software readable by a computer. Further, it is understood that if the controller 28 is a general or special purpose computer, the method in FIGS. 12A through 12E can be implemented by the controller 28 reading a computer readable medium to retrieve the method encoded on the computer readable medium. Once the write-once recording medium 22 is loaded in a drive system, the system controller 28 of the drive system identifies the loaded disc 22 (i.e., what the type of the loaded disc 22 is) whether the loaded disc 22 is recordable, and whether the loaded disc 22 is already used, using information stored in the loaded disc 22. If the loaded write-once recording medium is identified as an empty disc 22 in operation 10, the system controller 28 performs an initialization process according to a command of a user or the intention of a drive manufacturer.

In operation 15, the system controller 28 determines whether to implement a DM mode according to the intention of a user or a drive manufacturer. When the system controller 28 determines not to perform defect management according to according to the intention of a user or a drive manufacturer and selects the DM-off mode, initialization information is recorded in the disc 22 in operation 20, and the process goes to A in FIG. 12E. Since defect management is not performed in the DM-off mode and the spare area is not assigned, the size information of the spare area is recorded as "0" in the TDDS recorded in the TDMA and the DM mode is set to the DM-off mode.

When the system controller 28 selects the DM-on mode, it assigns the spare area to a portion of the data area of the disc 22 and records information necessary to defect management by a drive device and the initialization information in the disc (operation 30). More specifically, initialization is included in TDDS #0, SBM #0, and TDFL #0 and then recorded in the TDMA. With reference to the embodiment as shown in FIG. 7, TDDS #0 includes the size and location information of the spare area provided in the data area, the starting location information and ending location information of the user data area, the TDFL pointer, and the DM mode set to the DM-on mode. Once the disc 22 is initialized, the DMA of the disc 22 is empty and the TDMA enters a state where the TDMA can be updated.

After initialization, the recording/reading unit 21 and the control unit 23 performs recording through a verify-after-write procedure for defect management in response to a recording command of a host (operation 40). Hereinafter, the verify-after-write procedure of operation 40 will be described in greater detail with reference to FIG. 12B. In operation 41, user data is recorded in the user data area in units that the verify-after-write procedure is performed. In operation 42, recorded data is verified to find a portion where a defect is generated and a replacement block that replaces a defect block is recorded in the spare area. In operation 43, information on the defect is created and stored in the memory. In operation 44, it is determined whether a predetermined recording operation is completed. If the predetermined recording operation is not completed, a process goes to operation 41 and recording is repeated. If the predetermined recording operation is completed, the process goes to operation 50 shown in FIG. 12A and in greater detail in FIG. 12C.

In operation 50, defect information and defect management information are updated in operation units. The update procedure of operation 50 will be described in detail with reference to FIG. 12C. In operation 51, information on the defect, stored in the memory, is read in. In operation 52, a defect list including the information on the defect is created. In operation 53, the created defect list is recorded as TDFL # i in the TDMA, where i corresponds to a number of the recording operation. In operation 54, TDDS # i and SBM # i are recorded in the TDMA. Detailed examples of such operation 40 of performing recording through the verify-afterwrite procedure and operation 50 of updating the defect information and defect management information will be described with reference to FIG. 13.

Figure 13:
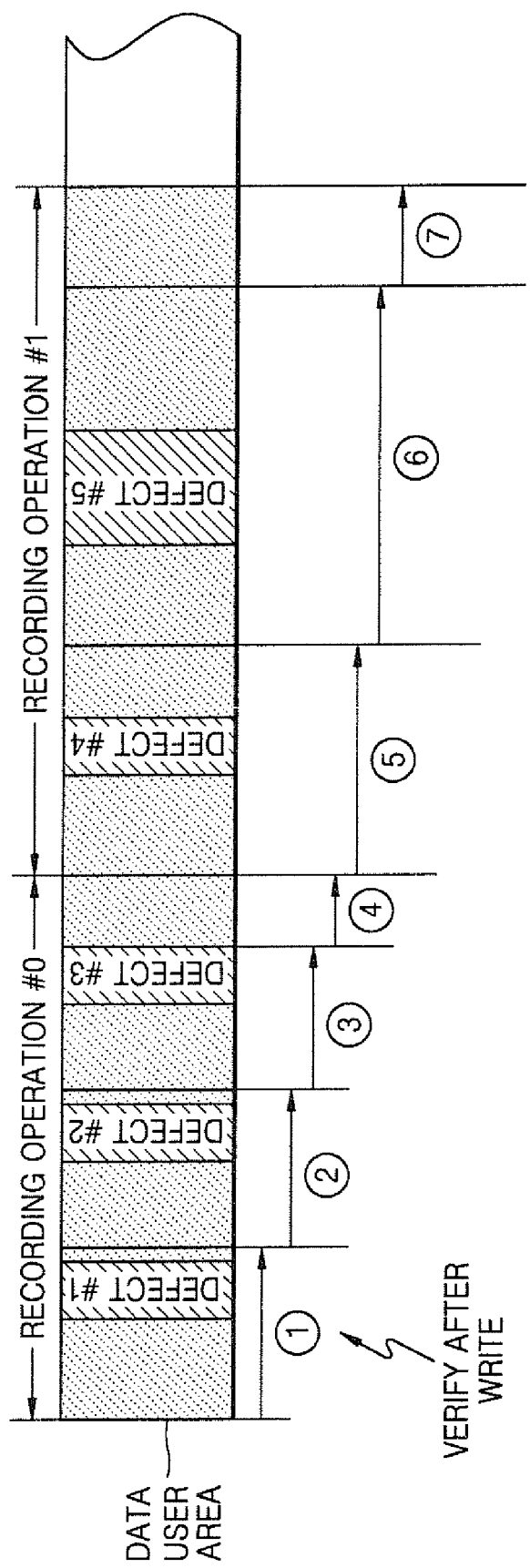
FIG. 13 is a reference view for explaining a process of defect management according to an embodiment of the present invention.

FIG. 13 is a reference view for explaining a process of defect management according to an aspect of the present invention. Here, a data processing unit can be divided into a sector and a cluster. The sector is a minimum data unit that can be managed by a file system of a computer or an application program. The cluster is a minimum data unit that can be physically recorded in a disc at a time. In general, at least one sector constitutes one cluster.

The sector comprises a physical sector and a logical sector. The physical sector is a space of a disc where data corresponding to one sector is recorded. An address used to find the physical sector is called a physical sector number (PSN). The logic sector is a sector unit used to manage data in the file system or the application program. Likewise, a logical sector number (LSN) is assigned to the logical sector. A data recording and/or reproducing apparatus such as that shown in FIG. 11, which records data to and reads data from the disc, finds the location of data to be recorded or reproduced on the disc using the PSN, whereas a computer or an application program for recording or reproducing data manages the entire data in units of logical sectors and finds the location of the data using the LSN. The relationship between the LSN and the PSN is converted using a fact of whether or not a defect is generated and a location where data recording starts.

Referring to FIG. 13, a user data area and a spare area are shown. In the user data area and the spare area, there is a plurality of physical sectors (not shown) to which PSNs are sequentially assigned. LSNs are assigned to at least one physical sector unit. However, the LSNs are assigned to replacement areas of the spare area except for defect areas of the user data area where defects are generated. As a result, although the physical sector and the logical sector are the same in size, if the defect areas are generated, the PSNs and the LSNs become different.

The user data is recorded in the user data area according to a sequential recording mode or a random recording mode. In the sequential recording mode, the user data is sequentially and continuously recorded. In the random recording mode, the user data is not necessarily continuously recorded, but is recorded at random. (1) through (7) indicate unit areas in which verify-after-write procedure is performed. The data recording and/or reproducing apparatus records the user data in the unit area (1), the data recording and/or reproducing apparatus returns to start of the unit area (1) and verifies if the user data is recorded normally or a defect is generated. If a cluster where a defect is generated is found, the cluster is identified as a defect cluster and is designated as a defect area (i.e., a defect #1). Also, the data recording and/or reproducing apparatus rewrites the user data, which has been recorded in the defect #1, in the spare area. A part of the spare area where the user data is rewritten is designated as a replacement #1. Next, after recording the user data in the unit area (2), the data recording and/or reproducing apparatus returns to start of the unit area (2) and verifies if the user data is recorded normally or a defect is generated. If at least one cluster where a defect is generated is found, such a cluster is designated as a defect #2. In the same manner as the above, a replacement #2 corresponding to the defect #2 is designated. Also, in the unit area (3), a defect area (i.e., a defect #3), and a replacement #3 corresponding to the defect #3 are designated. In the unit area (4), a part where a defect is generated is not found and there is no defect area.

After recording and verification are completed to the unit area (4), if termination of a recording operation #1 is expected (for example, if a user pushes an eject button or recording of the user data assigned to the recording operation #1 is completed), the data recording and/or reproducing apparatus records in the TDFL temporary defect information (i.e., TDFL #1) location information of the defects #1 through #3 that are generated in the unit areas (1) through (4). Also, management information for management of TDFL #1 is recorded as TDDS #1 in the TDMA.

Once the recording operation #1 starts, data is recorded in (5) through (7) the same way as in the unit areas (1) through (4). Thus, defects #4 and #5 and replacements #4 and #5 corresponding thereto are designated. The defects #1, #2, #3, and #4 are single defect blocks, each of which includes a defect. The defect #5 is a consecutive defect block whose consecutive blocks include defects. The replacement #5 is a consecutive replacement block that replaces the defect #5. A block is a physical or logical recording unit and may vary. If completion of the recording operation #1 is expected, the recording apparatus records temporary defect information #2 (i.e., TDFL #2), including information on the defects #4 and #5 and further records information recorded in the temporary defect information #1 accumulatively. Likewise, defect management information for management of TDFL #2 is recorded as TDDS #2 in the TDMA.

Referring back to FIG. 12A, the system controller 28 determines whether to change the size of the spare area in operation 60 when the spare area is not enough and needs to be enlarged or the user data area is not enough and the spare area needs to be reduced. If the system controller 28 determines to change the size of the spare area, reinitialization information is recorded in the disc 22 in operation 70 and the process goes to operation 40. In other words, the changed size information of the spare area is included in the TDDS and the TDDS is recorded in the TDMA.

Next, the system controller 28 determines whether to reinitialize the disc 22 to the DM-off mode (operation 80). If the system controller 28 determines to reinitialize the disc 22, the reinitialize information is recorded in the disc 22 in operation 81 and the process goes to A shown in FIG. 12E. If the disc 22 is reinitialized to the DM-off mode, the DM-on mode set in the TDDS is converted into the DM-off mode to update the TDDS and the TDDS and the TDFL finally updated in the TDMA are recorded in the DMA for compatibility with rewritable media.

Next, the system controller 28 determines whether to finalize the disc 22 (operation 90). If the system controller 28 determines not to finalize the disc 22, the process goes to operation 40 and recording is performed through the verify-after-write procedure. If the system controller 28 determines to finalize the disc, the system controller 28 records finalization information in the disc (operation 100).

Figure 12A:
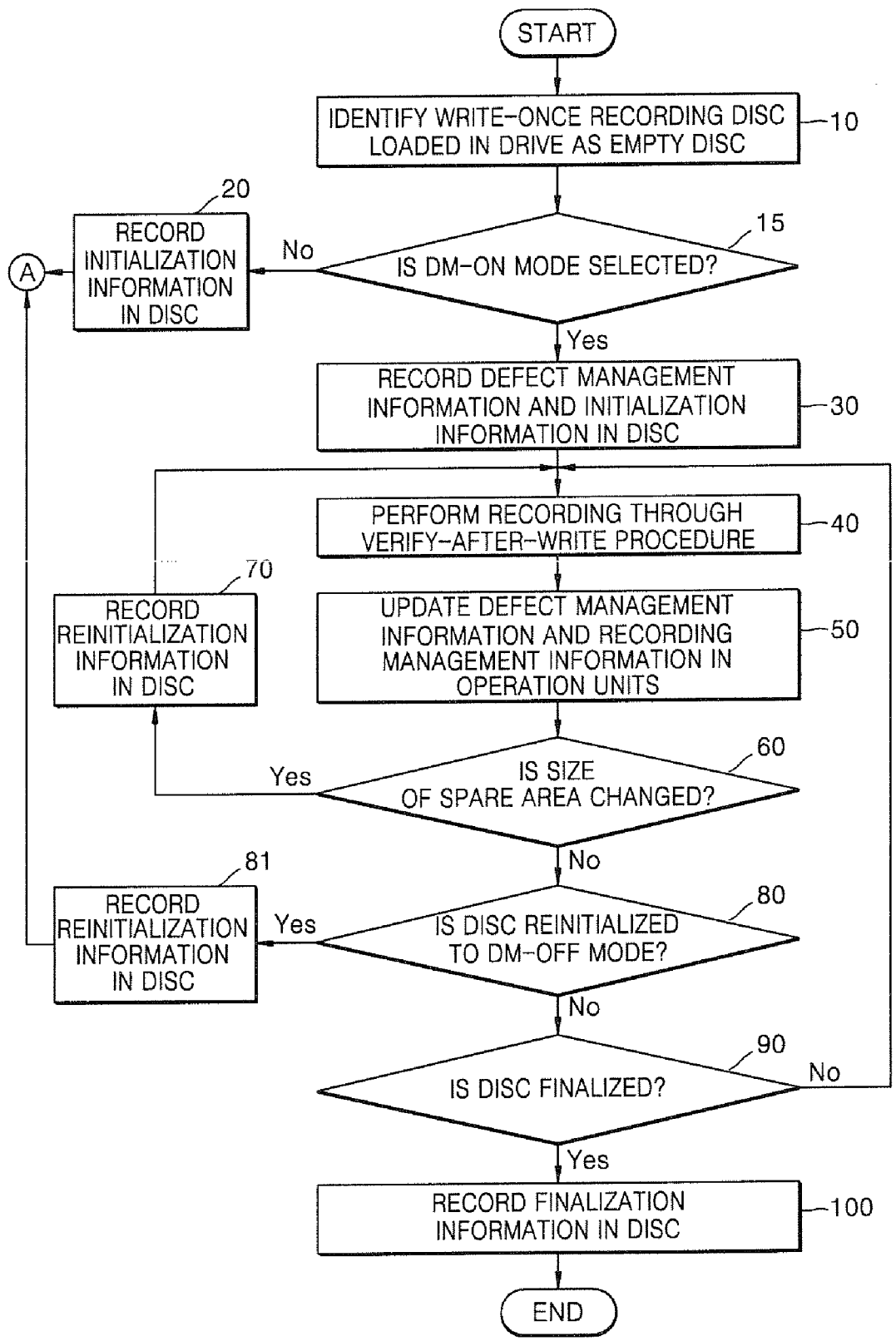
FIGS. 12A through 12E are flowcharts illustrating a method of using the write-once recording medium in a defect management (DM)-on mode or a DM-off mode according to an embodiment of the present invention.
Figure 12B:
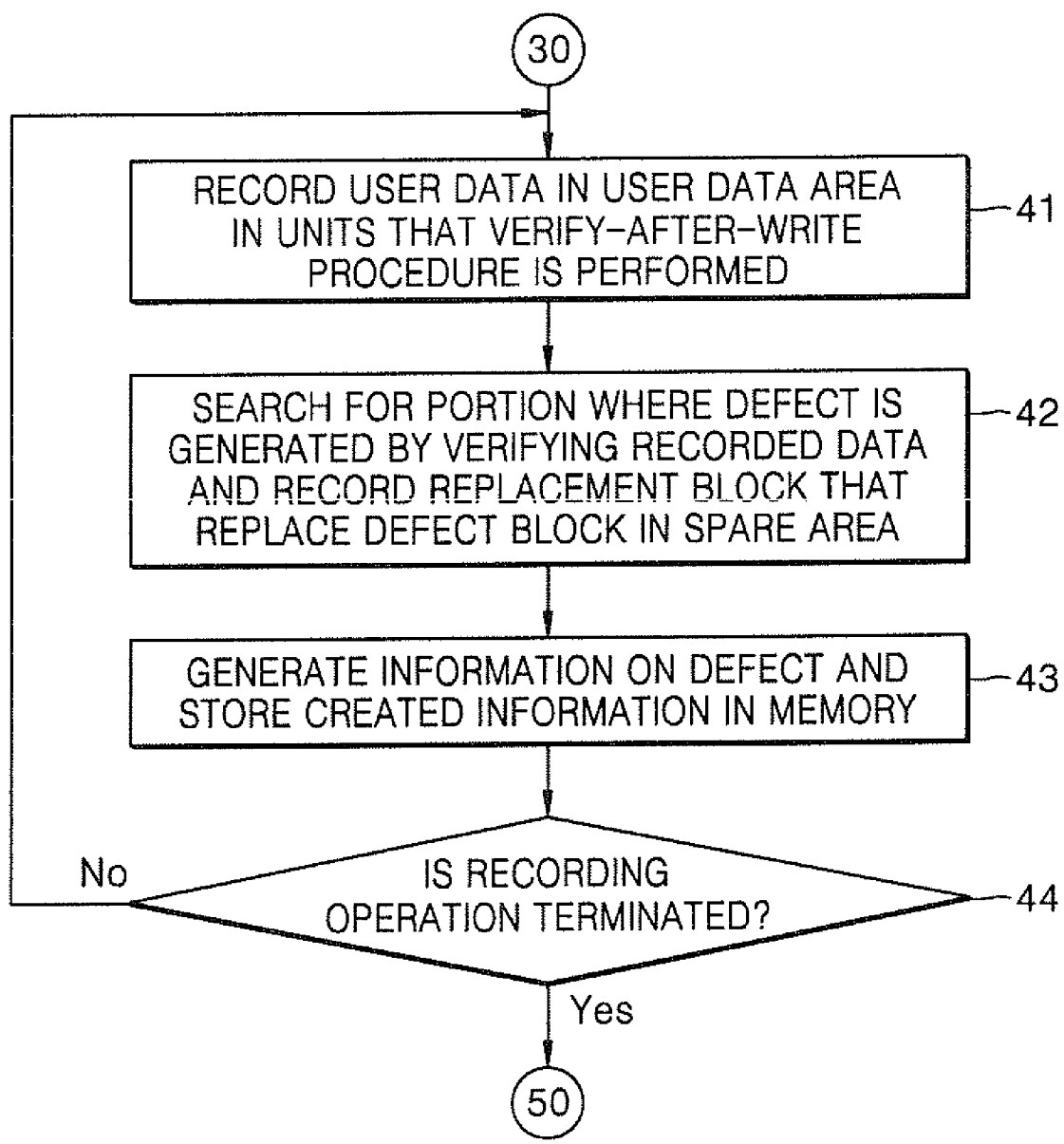
Figure 12C:
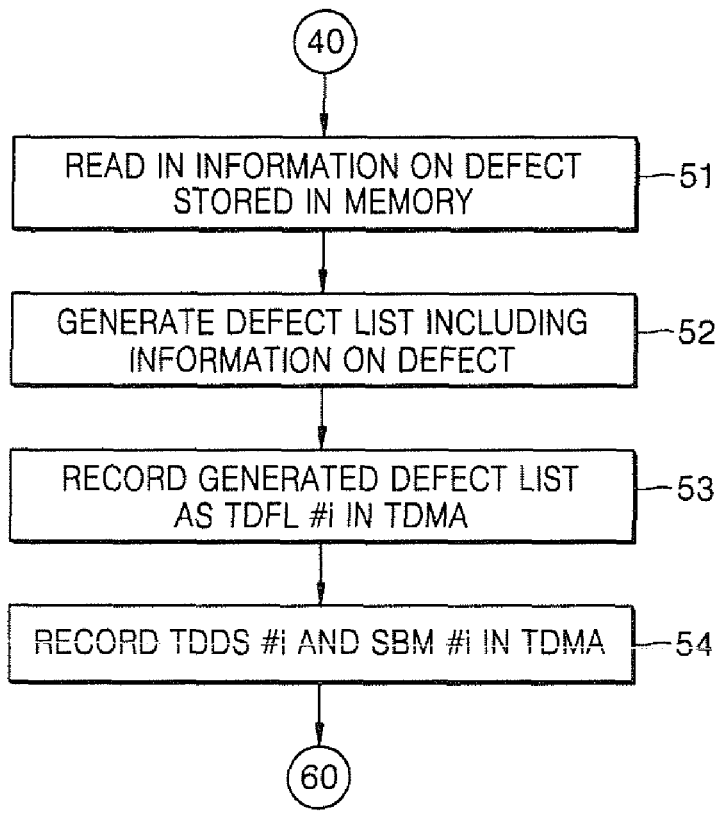
Figure 12D:
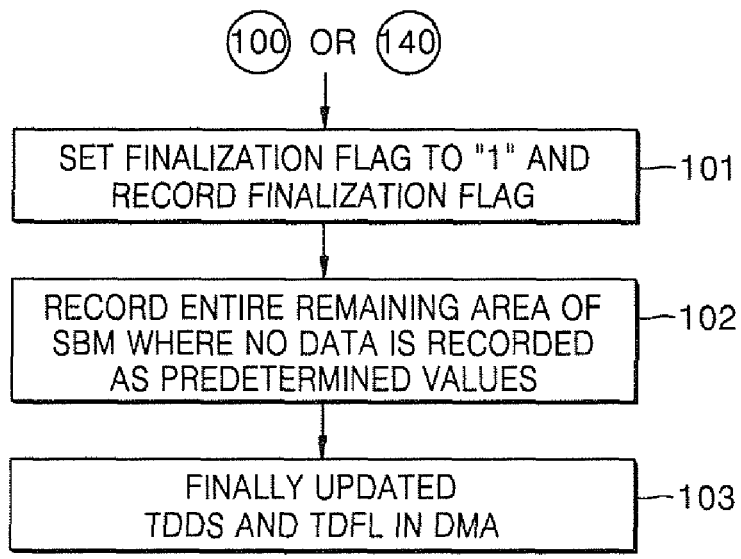

Recording of the finalization information in the disc of operation 100 will be described in detail with reference to FIG. 12D. The system controller 28 sets the finalization flag to "1" in the TDDS or the SBM in operation 101 and records specific values in the entire remaining area of the SBM that is not written to in operation 102. According to shown embodiments, the specific values may be recorded in the entire remaining area of the TDMA that is not written to. In operation 103, the finally updated TDDS and TDFL recorded in the TDMA fill in the DMA.

Figure 12E:
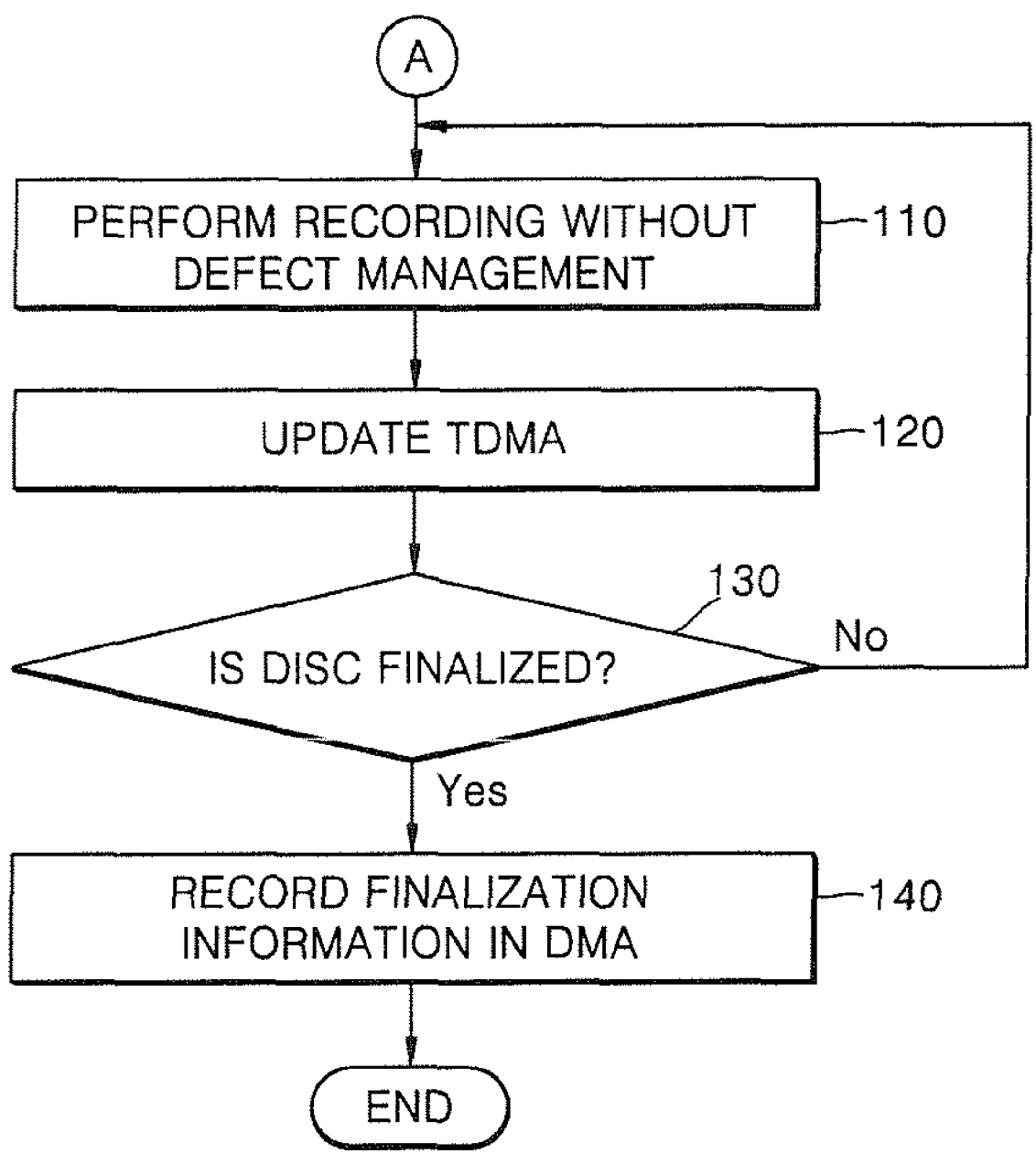

Next, operations when the DM-off mode is selected will be described with reference to FIG. 12E. In operation 110, the system controller 28 controls the recording/reading unit 21 to record data in the disc 22 without defect management. In operation 120, the system controller 28 updates the TDMA. Since defect management is not performed, updates in the TDMA are mainly to the TDDS and SBM. In operation 130, the system controller 28 determines whether to finalize the disc 22.

If the system controller 28 determines to finalize the disc 22, finalization information is recorded in the DMA (operation 140). The recording of the finalization information in operation 140 is the same as the description set forth above with reference to FIG. 12D and is not again set forth. If the system controller 28 determines not to finalize the disc 22, the process goes to operation 110 and recording is performed without defect management.

As described above, according to aspects of the present invention, a recording medium can be selectively used while defect management is performed on the recording medium or not performed according to the selection. Also, it is possible to use the recording medium without defect management even after using the recording medium while defect management is performed on the recording medium. Additionally, the recording medium can be used compatibly with rewritable media. Moreover, the recording medium can be CD-R, DVD-R, Bluray discs, Advanced Optical Discs (AODs), rewritable media, magnetic media and/or magneto-optical media which perform defect management.

The recording/reproducing method can be implemented as computer readable codes in computer readable recording media. The computer readable recording media include all kinds of recording apparatuses in which data that can be read by a computer system is stored. Such computer readable recording media are ROM, RAM, CD-ROM, magnetic tape, floppy disk, and optical data storage, and transmissions via the Internet (e.g., carrier wave). The computer readable recording media can be distributed in a computer system connected to a network, and can be stored and operated in forms of computer readable codes. Functional programs, codes, and code segments for implementing the recording/reproducing method can be easily construed by programmers skilled in the art.

While embodiments of the present invention has been particularly shown and described with reference to exemplary embodiments thereof, it will be understood by those of ordinary skill in the art that various changes in form and details may be made therein without departing from the spirit and scope of the present invention as uefineU by the following claims and equivalents thereof.

What is claimed is:

1. An apparatus for recording and/or reproducing data with respect to a recording medium, the apparatus comprising:
a pickup configured to emit a light to transfer data with respect to the recording medium; and
a control unit configured to:
select a defect management mode selectable between a defect-management-on mode and a defect-management-off mode;
determine a size of a spare area, the spare area being used for replacing a defective block and being allocated in a data area according to the selected defect management mode;
control the pickup to record temporary defect management information comprising a space bit map, a temporary defect list and a temporary disc definition structure in a temporary disc management area provided in a lead-in area of the recording medium, the temporary disc definition structure comprising information on the size of the allocated spare area and location information of the temporary defect list
control the pickup to record data on the recording medium while performing defect management using the spare area, in response to the defect-management-on mode being selected; and
control the pickup to record the data on the recording medium without defect management, in response to the defect-management-off mode being selected,
wherein, when the defect management mode being the defect-management-off mode, the size of the spare area is zero
wherein the temporary defect list includes at least one of defect list entry including information on defect block generated in the user data area, and the information on defect block includes address information of the defect block, and address information of replacement block corresponding to the defect block, and information on whether the defect block is generated in consecutive blocks, and
wherein the space bit map indicates recording state in each blocks of physically recording available space as distinguishable values.

2. An optical recording medium, comprising:
a lead-in area;
a data area; and
a temporary defect management area provided in the lead-in area of the recording medium, the temporary defect management area configured to store temporary defect information comprising a temporary defect list, on a defect detected in the data area, a space bit map and a temporary disc definition structure used by a recording and/or reproducing apparatus to manage the temporary defect information,
wherein the temporary disc definition structure comprises information on a size of a spare area which is determined according to a defect management mode which is selectable between a defect-management-on mode in which defect management is performed and a defect-management-off mode in which defect management is not performed, the spare area being used for replacing a defective block and being allocated in the data area, and location information of the temporary defect list,
wherein, when the defect management mode is the defect-management-off mode, the size of the spare area is zero,
wherein the temporary defect list includes at least one of defect list entry including information on defect block generated in the user data area, and the information on defect block includes address information of the defect block, and address information of replacement block corresponding to the defect block, and information on whether the defect block is generated in consecutive blocks, and
wherein the space bit map indicates recording state in each blocks of physically recording available space as distinguishable values.

3. An apparatus for reproducing data from an optical recording medium comprising a lead-in area, a data area, a temporary defect management area to store temporary defect information comprising a temporary defect list, on a defect detected in the data area and a temporary disc definition structure for managing the temporary defect information, the apparatus comprising:
a pickup configured to emit or receives a light to transfer data with respect to the optical recording medium, and
a controller configured to control the pickup to read the temporary defect management information comprising a space bit map, the temporary defect list and the temporary disc definition structure which comprises information on a size of a spare area and location information of the temporary defect list from the temporary defect management area arranged in the lead-in area, the spare area being used for replacing a defective block and being allocated in the data area, wherein the information on the size of the spare area is determined according to a defect management mode which is selectable between a defect-management-on mode in which defect management is performed and a defect-management-off mode in which defect management is not performed, wherein, when the defect management mode is the defect-management-off mode, the size of the spare area is zero, wherein the temporary defect list includes at least one of defect list entry including information on defect block generated in the user data area, and the information on defect block includes address information of the defect block, and address information of replacement block corresponding to the defect block, and information on whether the defect block is generated in consecutive blocks, and wherein the space bit map indicates recording state in each blocks of physically recording available space as distinguishable values.

4. The apparatus of claim 1, wherein a copy of the temporary defect list and a copy of the temporary disc definition structure are recorded in a defect management area arranged in the lead-in area, during finalization of the recording medium.

5. The optical recording medium of claim 2, wherein a copy of the temporary defect list and a copy of the temporary disc definition structure are recorded in a defect management area arranged in the lead-in area, during finalization of the recording medium.

6. The apparatus of claim 3, wherein a copy of the temporary defect list and a copy of the temporary disc definition structure are recorded in a defect management area arranged in the lead-in area, during finalization of the recording medium.

* * * * *